United States Patent [19]

Mallory et al.

[11] 3,854,011

[45] Dec. 10, 1974

[54] FRAME SYNCHRONIZATION SYSTEM FOR DIGITAL MULTIPLEXING SYSTEMS

[75] Inventors: Peter E. Mallory, New Smyrna Beach; Raehn Davis, Altamont Springs; Richard S. Van de Houten, Maitland, all of Fla.

[73] Assignee: General Dynamics Corporation, St. Louis, Mo.

[22] Filed: Sept. 24, 1973

[21] Appl. No.: 400,284

[52] U.S. Cl. .......................... 179/15 BS, 178/69.5 R
[51] Int. Cl. .......................... H04j 3/06
[58] Field of Search ....... 179/15 BC, 15 BS, 15 BY; 178/69.5 R

[56] References Cited

UNITED STATES PATENTS 3,794,773 2/1974 Jacob .............................. 179/15 BS
3,798,378 3/1974 Epstein .......................... 178/69.5 R

*Primary Examiner*—Ralph D. Blakeslee
*Attorney, Agent, or Firm*—Martin Lukacher

[57] ABSTRACT

A frame synchronizer for use in a digital multiplexing system is disclosed which uses a pseudo random (PN) sequence generator to generate a frame word in the demultiplexer which is similar to the frame word generated in the multiplexer. The input data is compared with the output of the PN sequence generator to determine the presence of synchronization. Parallel upshift registers in which the input data is stored are used to initialize the demultiplexer PN sequence generator; thus programming that generator by the data so as to obtain more rapid frame synchronization.

10 Claims, 5 Drawing Figures

FRAME SYNCHRONIZATION SYSTEM FOR DIGITAL MULTIPLEXING SYSTEMS

The present invention relates to multiplexing systems and particularly to frame synchronizers for the demultiplexers of such systems.

The present invention is especially suitable for use in digital multiplexing systems for PCM (pulse code modulated) digital data wherein a large number of channels, for example telemetry channels, are transmitted asynchronously in successive frames. Features of the invention will however be generally applicable for the location of synchronization sequences in multiplexer frames in various types of pulse code modulation (PCM) multiplex systems whether for telemetry or telephone channels or otherwise.

The classical approach to the frame synchronization problem is to store a column of the frame (viz., the column which contains a possible frame sync sequence or word, in a shift register. The contents of the shift register are then compared with a reference sequence, and if they agree, the stored column is taken to be the frame sync word or sequence. This approach requires a significant amount of memory (data storage capacity) dedicated to the synchronizer function. It is also prone to errors, especially burst errors and is relatively slow since at least two sync word lengths must be observed in each column before that column can be rejected. Patents which are representative of the foregoing classical approach are U.S. Pat. Nos. 3,127,475; 3,274,340; 3,454,722; 3,504,287; 3,557,314; and 3,576,947. Attempts have been made to speed up the frame synchronization process by delaying or shifting in phase the reference sync sequence with respect to the column of data which is compared with the reference sequence to determine if it is the correct sync sequence (see U.S. Pat. Nos. 3,594,502; 3,649,758; and 3,678,200). Further attempts, especially directed to overcome the problem of burst errors have involved utilizing distributed frame sync sequences and code generators which are programmed, as by changing the rate of counting of data pulses in a counter, to generate a synthetic frame sync sequence corresponding to the incoming distributed frame sync sequence from the multiplexer (see U.S. Pat. Nos. 3,065,302; 3,065,303; 3,069,504; and 3,087,996).

More recently it has been proposed to multiplex a channel so as to transmit a pseudo-random (PN) code word which is detected in the demultiplexer as by matched filter techniques so as to locate the frame sync sequence (see U.S. Pat. Nos. 3,532,985; 3,510,595; 3,699,344; and 3,731,198). Still another approach utilizing PN sequences involves the synthesization of a PN sequence, hopefully corresponding to the transmitted PN sequence in the demultiplexer and then comparing the transmitted and demultiplexer synthesized PN sequences (see U.S. Pat. Nos. 3,475,599; 3,566,268; 3,648,237; and 3,694,757).

All of the foregoing approaches suffer from the requirement that distributed format structures, especially those in which a large number of data channels are multiplexed, require a large number of rows of data to be searched so as to input sufficient bits of a column suspected to contain a frame sync sequence into the PN sequence generator before the new column can be searched by the comparison of the bits therein with the bits outputted from the PN sequence generator. Thus, even through the use of a PN sequence generator as has heretofore been suggested, synchronization has not been accomplished as rapidly as is desired. In distributed format structures containing a large number of channels and data words, the mean time to reach the sync is prolonged.

It is a feature of this invention to provide an improved frame synchronizing system which requires the search of significantly less bit positions than is even contained in the frame sync sequence in otder to detect the absence of the entire sync sequence.

It is a further feature of the invention to eliminate even the need to wait for the reception of several rows of sequential data before a PN sequence generator can be conditioned to search for a new sync sequence; thus reducing the time to acquire frame synchronization such that incoming data can be demultiplexed.

Accordingly, it is an object of the present invention to provide improved systems for PCM digital communications and/or telemetry.

It is a still further object of the present invention to provide an improved system for providing frame synchronization for received data messages as are provided in PCM telemetry, telephony, or other communication systems.

It is a still further object of the present invention to provide an improved system for detecting or locating frame sync data sequences in a data format structure without excessive utilization of memory.

It is a still further object of the present invention to provide an improved system for acquiring or detecting frame sync which reduces the time required for sync acquisition.

It is a still further object of the present invention to provide an improved system for detecting or acquiring frame sync in a data message format which requires few component parts and may be implemented more simply and at lower cost than is the case for conventional frame sync systems.

It is a still further object of the present invention to provide an improved system for synchronizing a data receiver which is adapted to receive distributed frame sync patterns.

It is a still further object of the present invention to provide an improved PCM telemetering demultiplexer.

Briefly described, a frame synchronizing system for a demultiplexer of a digital multiplexing system in accordance with the invention is operative to search for and locate a pseudorandom (PN) frame sync sequence of bits. The demultiplexer has its own PN sequence generator which generates a serial PN bit sequence as a function of the input data which is received by the demultiplexer. The input data is simultaneously applied to the sequence generator and to a storage register. As each bit of the input data is compared to the output bits from the PN generator, an indication as a result of the comparison that an input data bit is absent in the PN bit sequence enables the parallel upshift or transfer of data from the register into the PN generator, thus initializing the PN generator to a new sequence on the basis of a different combination of input data bits from the next possible sync sequence to be searched. Good compares (i.e., that the data bits are present in and not absent from the sync sequence.) permit a continuous serial updating of the PN generator and the storage register. When as a result of a sequence of successive tests, which indicate good compares (i.e., the presence of the frame sync pattern), the system will have acquired or located the frame sync pattern, such that the frame rate of the demultiplexer can be adjusted in accordance therewith so as to synchronously demultiplex or decode the transmitted channels of data in the data message format structure.

The foregoing and other objects and advantages of the present invention as well as aditional features thereof will be more readily apparent from a reading of the following description in connection with the accompanying drawings in which.

Figure 1:
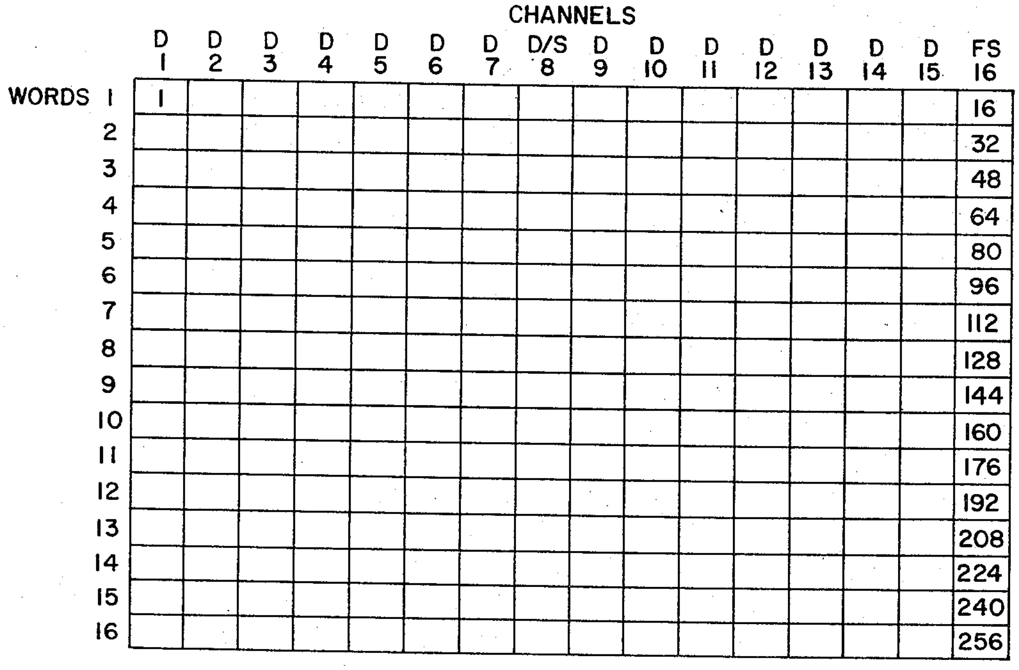
FIG. 1 is a diagram showing the data message format structure containing a distributed frame sync sequence or pattern which is multiplexed and demultiplexed by a multiplexing system embodying the invention.
Figure 2:
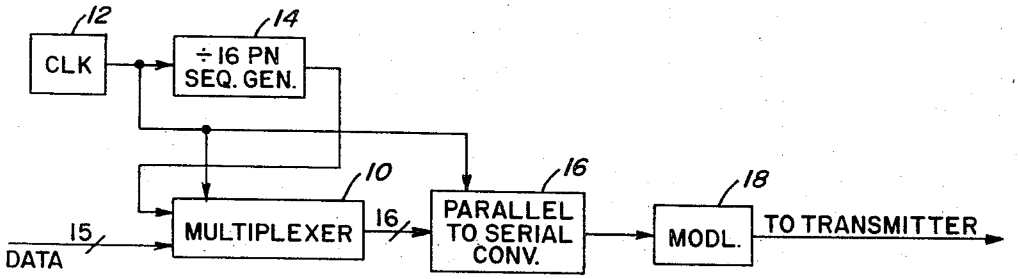
FIG. 2 is a block diagram of the multiplexer of a digital multiplexing system which embodies the invention.

In the frame format as shown in FIG. 2, sixteen channels are combined on each multiplexing cycle to provide a 16-bit word per row of the format. The frame synchronization sequence or pattern is shown as being placed in column 16. Column 8, for example, may contain the so-called overhead wherein bits representing stuff or spill command are placed. Stuff or spill bits in the overhead channels are provided wherever asynchronous digital multiplexing is desired. As shown in FIG. 1, each of the words is transmitted serially. The 16th bit is the last bit of the first word and the first bit in the frame sync column. The 32nd bit is then the second frame sync bit. The 64th bit, the third frame sync bit, and so forth for each of the remaining words until the last or 256th bit in the frame format is the 16th and last bit of the frame sync column.

As shown in FIG. 2 each of the 15 data channels and the frame sync channel are multiplexed in a multiplexer 10, which may be of a design used in conventional telemetry systems. Since the frame sync word or column is distributed throughout each of the 16 words of the format, the format is considered to have the distributed frame sync sequence. The multiplexer 10 itself may be a commutator of the type conventionally used in telemetry multiplexing systems. The multiplexer 10 is driven by a clock pulse source 12 which also drives a divide-by-16 PN sequence generator 14. The PN sequence generator has four stages which are programmed (i.e., preset) to generate a predetermined pseudorandom (PN) sequence at the divided clock pulse rate. The shift register is allowed to run or recirculate at the divided clock rate through a feedback logic network, such as to generate the PN sequence. Since the PN sequence generator 14 runs at 1/16th the bit rate, one new PN sequence bit is provided for each row of the format as illustrated in FIG. 1.

The 16 output lines from the multiplexer 10 are applied to a parallel to serial converter 16 which translates the 16 lines into a serial data stream which is applied to a modulator 18, such as a phase shift keyer which is then applied to a transmitter for communication over a radio, say FM/FM, telemetry link, wire line, or the like.

Figure 3:
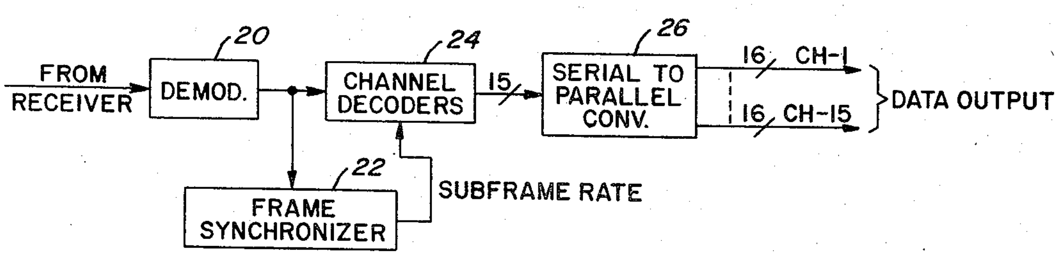
FIG. 3 is a block diagram of the demultiplexer of a multiplexing system embodying the invention.

The transmitted data is detected in a receiver where it is demodulated in a demodulator 20 (see FIG. 3) which produces a digital data (PCM) pulse stream. This pulse stream provides the input data to a frame synchronizer 22. The frame synchronizer 22 detects the frame sequence and after acquiring or locating frame sync provides pulses at the sub-frame rate to channel decoders 24 which produce the 15 parallel data channels in each frame format. The channel decoders may be digital decommutating switches as is conventionally used in PCM demultiplexers. Each of the 15 data channels appears on a different one of the 15 outputs of the decoders, and is converted into a 16-bit channel word by serial to parallel converters 26. In the event that an overhead channel is used, the stuff or spill bits in that channel are detected by decoding logic, the data will then be digitally filtered in a smoothing buffer, the techniques for loading the overhead channel upon multiplexing, and removing or adding stuff or spill bits may be provided by techniques conventional in the telemetry art. The demultiplexer thus provides 15 channels of output data which may be recorded, applied to digital to analog converters, and used for data analysis, communications, or other signalling purposes.

Figure 4:
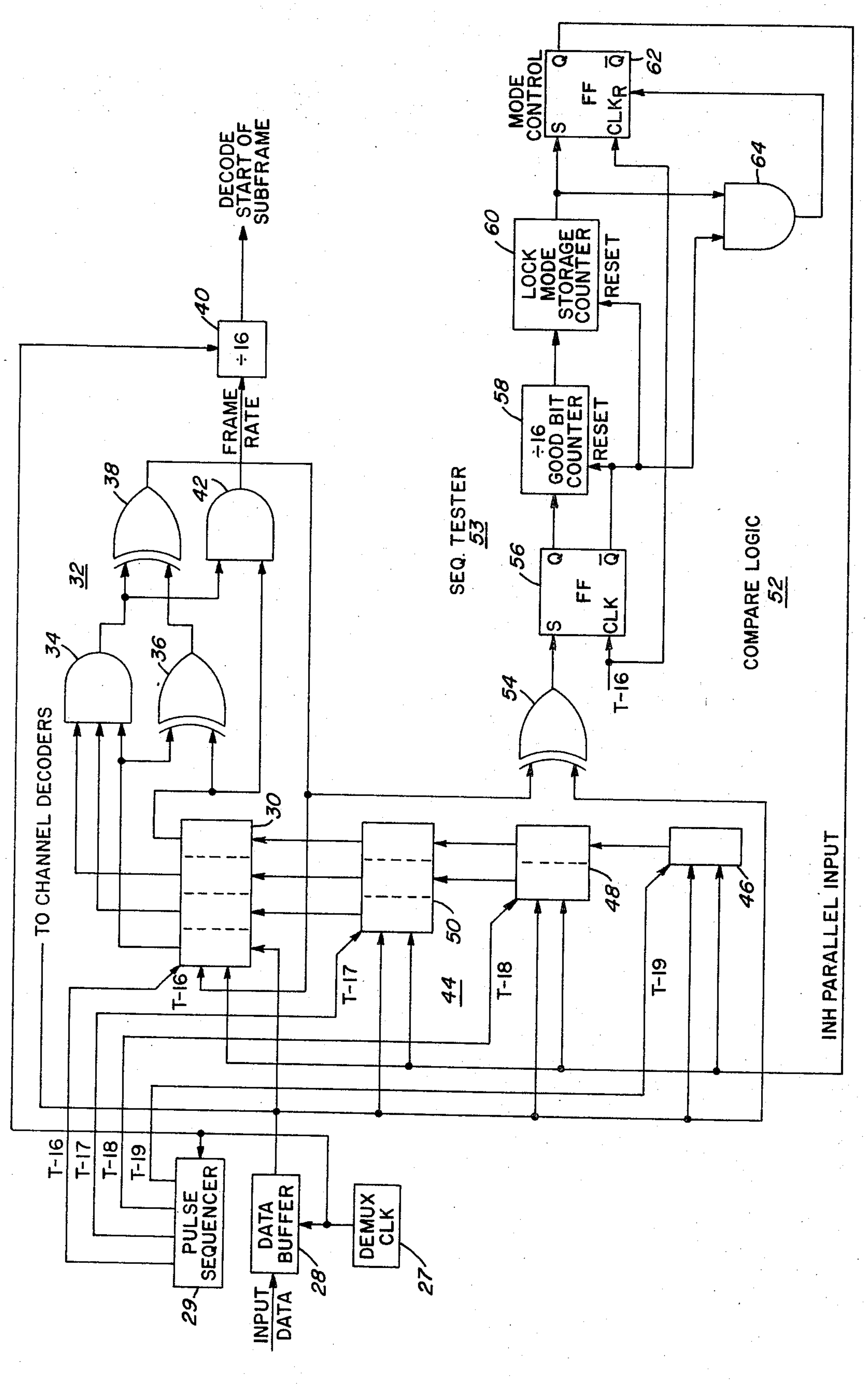
FIG. 4 is a more detailed block diagram of the frame synchronizer shown in FIG. 3.
Figure 5:
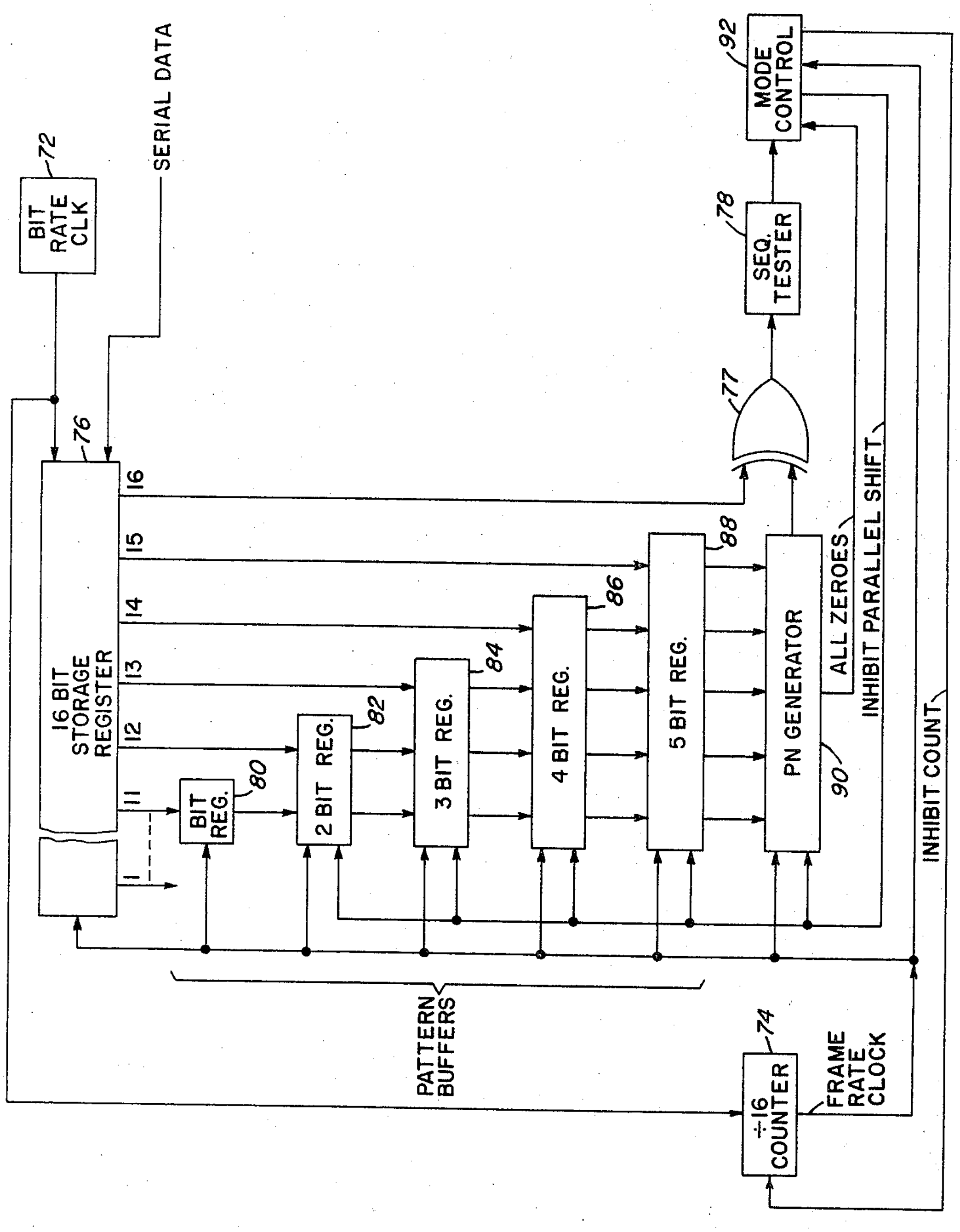
FIG. 5 is a block diagram of a frame synchronizer which may be used in the demultiplexer shown in FIG. 3 and which is provided in accordance with another embodiment of the invention.

Two embodiments of the frame synchronizer 22 are illustrated in FIGS. 4 and 5. As shown in FIG. 4 the input data to the frame synchronizer is stored in a data buffer 28 which may be a shift register which is strobed by the demultiplexer clock generator 27. The demultiplexer clock 27 may be obtained by a synchronization circuit, such as a phase lock loop locked to the bit rate of the input data. The input data is applied from the output of the data buffer 28 to the channel decoders and also to a PN sequence generator 30 similar to the sequence generator 14 in the multiplexer (FIG. 2). A four stage shift register is used, together with a feedback logic circuit 32 including an AND gate 34 and two EXCLUSIVE-OR gates 36 and 38. The data stored in each of the four stages of the register 30 is fed back via these gates 34, 36 and 38 to the input of the register 30. The register 30 itself may be an integrated circuit such as type SN 7495A. The feedback from the EXCLUSIVE-OR gate 38 is to the serial input of the register, while the data input from the buffer 28 is to the first stage parallel input of the register. Accordingly, when the proper PN sequence is generated the parallel inputs are inhibited and the PN generator is allowed to free-run at the frame rate. The frame rate pulses are applied to the shift input of the register 30 and are indicated as the T16 pulses. These frame rate pulses are applied to a divide-by-16 counter 40 which divides the demultiplexer clock to produce the sub-frame rate pulses which also correspond to the T16 pulses. The counter is reset by an AND gate 42 connected to the feedback logic circuit 32, once each 16 bits (i.e., each row word time) in synchronism with the demux clock when the transmitted PN sequence from the multiplexer is identical to the demultiplexer generated PN sequence. Otherwise, the counter is reset, say three counts, so as to pull the demux clock into synchronization.

Initially, the PN sequence is derived from the input data which is inputted to and stored in a storage or sample register 44. The storage register consists of three registers 46, 48 and 50. The register 46 may be a JK flip-flop and the registers 48 and 50 may be shift registers similar to the register 30 in which only two or three of the four stages available in the integrated circuit are used.

When the synchronizer is in sync, the contents of format column 16 (see FIG. 1) are serially loaded into the shift register 50, the contents of format column 1 are read into shift register 48, and the contents of column 2 are loaded into the register 46. This is accomplished by the proper phasing of frame rate pulses T17, T18, and T19. A pulse sequencer 29 (e.g., consisting of counters which count the demux clock and decoders which derive the frame rate pulses from the counters) is provided for the purpose. In this manner the next possible frame sync pattern is up-dated and ready for insertion into the PN generator 30.

When a loss of sync is detected, one word is allowed to elapse and then the contents of register 50 are shifted in parallel to register 30, while the bit from column 1 is input to the first position of shift register 30, by proper timing of frame rate pulse T16. Furthermore, the inhibit parallel input is low causing registers 50, 48, and 46 to be inputted in parallel from the register below it. This fills each register with bits from a column occurring 1 bit later in time.

The action of the buffer system thus allows the PN sequence generator to be re-initialized after only 1 word plus 1 bit rather than the 3 words and 1 bit which would be required to flush out column 16 out of the PN generator and enter column 1 if there were no buffers.

When the system is in check or lock the inhibit parallel input from the mode control flip-flop 62 is high, thus inhibiting the parallel inputs but allowing the registers 46, 48 and 50 to be serially loaded so as to be ready to input the next probable frame sync pattern in the event that the system shifts back to the search mode. In the check and lock modes the PN sequence is recirculated through the serial input of first stage of the register 30, as explained above.

With the synchronizer initially in the search mode, four bits are collected from the column being tested, three come from the register 50, and one comes from the bit stream. Each output bit from the generator as obtained from the output of the exclusive OR gate 38 is applied to compare logic 52. The compare logic 52 is provided by an EXCLUSIVE-OR gate 54 which also receives an input from the data stream at the output of the data buffer 28. Each bit out of the PN sequence generator is therefore compared against the corresponding data bit from the column being tested. The comparison is made once during each demultiplexer word time and at the anticipated position of the frame sync bit of each word. Timing such that the comparison is made at the frame sync word time is obtained by means of a flip-flop 56 of a sequential tester 53. The flip-flop 56 is clocked by the T16 pulse. Accordingly, if the compare is good, (i.e., the input bit and the PN sequence output bit are identical) a true or "one" level is applied to the set input of the flip-flop such that the Q output of the flip-flop 56 goes high.

The tester 53 also includes a good bit counter 58 which will then register a count upon each bit time in a frame sync word. The good bit counter 58 is a divide-by-16 counter, which when it reaches a counter 15, inputs a bit into a lock mode storage counter 60 of the tester 53. When this occurs the system enters into a more sophisticated lock mode operation determined by the counter 60 setting the mode control flip-flop 62 or allowing it to be reset via an AND gate 64. The lock modes and associated check modes are an approximation to the sequential probability ratio test. An extended discussion of this test and hardware for its implementation is included in U.S. Pat. No. 3,537,069. If the check or lock modes discover that the system is not in the proper sync position the system returns to the search mode.

Referring to FIG. 5, another embodiment of the frame synchronizer is shown in which the serial input data is buffered first in a 16-bit storage register 76. The outputs of the stoage register are labeled 1 through 16 to correspond to the channel that is clocked out at the word rate when the system is in sync. The data is shifted through the register by a bit rate clock 72 which may be provided by a phase lock loop synchronized to the input bit rate. The bit rate clock is divided by 16 in a counter 74 to provide a frame rate clock. Upon each frame clock pulse, a transfer enable pulse is applied to the storage register 76. The bit number 16 out of shift 76 is applied to EXCLUSIVE-OR gate 77 which inputs the sequential tester 78, which may be of the same design as the sequential tester shown in FIG. 4. The tester 78 operates a mode control 92 also similar to the mode control of FIG. 4.

Five storage registers 80, 82, 84, 86, and 88 constituting the frame pattern buffers, are included in the frame synchronizer. The register 80 may be a flip-flop; the other registers being shift registers. The eleventh bit in the storage register 76 is applied to the input of the flip-flop 80. The 12th stage of the register 76 is applied as a parallel input to the second stage of the two-bit register 82. The 13th stage of the storage register 76 is applied as an input to the third stage of the three-bit register 84. The 14th stage in the 16 bit register 76 is applied at the fourth stage in the four-bit register 86. The 15th stage in the 16-bit register 76 is applied as the input to the fifth stage of the 5-bit register 88. The other parallel inputs of the registers are applied thereto from the corresponding stages of the preceding or lower order registers. Shift inputs to the registers are obtained from the frame rate output of the divide-by-16 counter 74. A PN sequence generator 90 is also provided in the frame synchronizer shown in FIG. 5. The PN sequence generator may have five stages similar to the 5-bit register 88 and can receive parallel inputs from the 5 stages of the five-bit register 88.

Initially, the data will propagate through all of the registers such that the first five bits in a column are fed into the five shift register stages of the PN sequence generator 90. All of the registers and the register in the PN sequence generator, which is similar in design to the register 30 in the PN sequence generator shown in FIG. 4, except that the PN sequence generator 90 has an additional or fifth stage, are shift registers which have their parallel inputs inhibited when the check and lock mode tester sets the mode control such that the synchronizer is in the lock mode. The mode control produces either a lock or a no-lock output. Upon occurrence of a no-lock output (viz., upon rejection of a sync location) the mode control provides an inhibit count pulse to the divide-by-16 counter 74 inhibiting it from counting the next bit clock pulse. This aligns the counter 74 with the data location corresponding to that contained in the PN generator 90. Once frame sync has been acquired, the PN generator 90 is permitted to free run and the divide-by-16 counter will be locked at the frame rate such that the 16 bit storage register automatically accomplishes the channel decoding or demultiplexing.

After the first five bits in the column are fed to the five shift register stages of the sequence generator 90, the sixth bit will then be presenting itself at the output of the sixteenth stage of the storage register 76. Thus the sixth bit in the sync column is compared to the sixth bit of the PN sequence. Were it not for the parallel upshift from the register stages 80, 82, 84, 86 and 88 it would take five additional words of data in order to reset the sequence generator. However, through the use of these registers, whenever a position is rejected the contents of the register stages are all up-shifted so that the sequence generator is loaded with data for the check test to be performed on the next column.

Since it takes two bits on average to reject the false location, only two multiplied by 16 plus one bit or 34 bits are required to check out a column on the average. The initial five multiplied by 16, or 90 bits is eliminated by the use of the registers 80, 82, 84, 86 and 88. The mean time to acquire frame synchronization is therefore significantly reduced by means of the frame synchronizing system provided by the invention.

From the foregoing description it will be apparent that there has been provided improved multiplexing systems and particularly an improved frame synchronizer for the demultiplexer of a PCM telemetry system. The invention is especially useful for the rapid acquisition of frame synchronization where the frame format includes distributed frame sequences. When combined with a PN sequence generator the sequence generator is rapidly initialized to generate the transmitted frame sequence, thus reducing the time required to acquire frame synchronization, and thus enable the demultiplexing of the transmitted data messages.

While two embodiments of the frame synchronizer have been described for purposes of explaining the invention, it will be apparent that variations and modifications therein within the scope of the invention will undoubtedly suggest themselves to those skilled in the art. Accordingly, the foregoing description should be taken merely as illustrative and not in any limiting sense.

What is claimed is:

1. A frame synchronizing system for a demultiplexer of a digital multiplexing system wherein a frame sync pattern is a pseudo-random (PN) sequence of bits, said system comprising a. a PN sequence generator for generating a serial PN bit sequence as a function of input data to said demultiplexer, b. means for storing successive pluralities of sequential bits of said input data, c. means for sequentially comparing the bits of said input data with successive bits of said PN bit sequence from said generator, d. means operative when said comparing means indicates the absence of identity between bits compared therein for conditioning said PN generator to generate said serial PN sequence as a function of said plurality of bits then stored in said storing means.

2. The invention as set forth in claim 1 further comprising means responsive to a plurality of bit comparisons by said comparing means indicative of the presence of identity between bits compared therein for indicating that the PN bit sequence generated by said PN sequence generator corresponds to said frame sync pattern.

3. The invention as set forth in claim 2 wherein said storing means comprises a plurality of registers each having storage for a successively larger number of bits of said input data and means for storing said successive pluralities of input data bits simultaneously in said register, means for parallel loading (a) the bits from those of said pluralities of registers having storage for smaller numbers of bits into those of said pluralities of registers having storage for a next larger number of bits, so long as said plurality of bit comparisons indicative of the presence of identify do not occur, and (b) the bits of the one of said registers having storage for the largest number of bits into said PN sequence generator.

4. The invention as set forth in claim 3 wherein said PN sequence generator includes a shift register having storage for a larger number of bits than said one of said registers, and each of said register is also a shift register, means for applying said input data serially to said PN sequence register and into each of said storage registers, and means for enabling the parallel loading between said registers so long as said plurality of bit comparisons indicative of the presence of identity do not occur.

5. The invention as set forth in claim 4 wherein said multiplexing system is adapted to multiplex data in accordance with a distributed format structure wherein said frame sync pattern is constituted of a like ordered bit in successive multi-bit serial words, and wherein said frame synchronizing system further comprises means for generating clock pulses at the rate of said bits of said frame sync pattern, and means responsive to the absence of a plurality of said bit comparisons indicative of the presence of identity for adjusting the rate of said clock pulses.

6. The invention as set forth in claim 5 including means responsive to said clock pulses for entering and shifting said input data bits in said PN sequence register and in said storage registers.

7. The invention as set forth in claim 6 wherein said means responsive to said plurality of successive comparisons by said comparing means comprises sequential testing means for registering a plurality of said comparisons indicative of the presence of identity upon occurrence of each of said clock pulses, and mode control means for indicating said plurality of presence of identity comparisons when a predetermined number is registered in said sequented testing means.

8. The invention as set forth in claim 7 wherein said comparing means is an exclusive OR gate having its inputs connected to receive bits from said input data which correspond to bits in said PN sequence generator register having a predetermined bit spacing less than the total number of bits in said frame sync pattern.

9. The invention as set forth in claim 8 wherein said bit spacing is three bits.

10. The invention as set forth in claim 1 wherein said input data is stored in an input register having storage for the bits in said frame sync pattern or an integral submultiple thereof, and wherein said storage means includes storage registers comprising a register for storing one bit and a plurality of additional succeeding registers each having storage for one bit in addition to the storage capacity of its preceding register, said PN sequence generator being a register and the one of said storage registers of highest bit storage capacity having the same number of stages as said PN sequence generator register, parallel loading inputs between like ordered stages of said storage registers and between said highest capacity storage register and said PN sequence register, parallel loading inputs to the one bit register and to the last stage of each of said storage registers respectively from the first stage of said input data register and from each succeeding stage of said input register, a first input to said exclusive OR gate being from the stage of said input register next succeeding the last stage which has an output to a parallel load input of the highest capacity one of said storage registers, and the second input to said exclusive OR gate being from the last stage of said PN sequence generator register.

* * * * *